(12) United States Patent
Pessach

(10) Patent No.: US 7,424,739 B2
(45) Date of Patent: Sep. 9, 2008

(54) ON-MACHINE COMMUNICATION VERIFICATION

(75) Inventor: Janiv Pessach, Redmond, WA (US)

(73) Assignee: Microaoft Corporation, Redmond, WA (US)

( * ) Notice: Subject to any disclaimer, the term of this patent is extended or adjusted under 35 U.S.C. 154(b) by 793 days.

(21) Appl. No.: 10/977,400

(22) Filed: Oct. 29, 2004

(65) Prior Publication Data

US 2006/0095765 A1 May 4, 2006

(51) Int. Cl.
*G06F 9/00* (2006.01)
*G06F 7/04* (2006.01)
*G06F 11/00* (2006.01)
*H04L 9/00* (2006.01)

(52) U.S. Cl. ............... 726/17; 726/3; 726/4; 726/5; 726/6; 726/7; 726/27; 726/28; 726/29; 726/30; 713/168; 713/169; 713/170; 713/171; 713/172; 380/231; 380/232; 380/233; 380/234; 380/235; 380/236; 380/237

(58) Field of Classification Search .............. 726/17; 713/168
See application file for complete search history.

(56) References Cited

U.S. PATENT DOCUMENTS 6,314,501 B1 * 11/2001 Gulick et al. ............ 711/153
2002/0133607 A1 * 9/2002 Nikander ................ 709/229

* cited by examiner

*Primary Examiner*—Longbit Chai
(74) *Attorney, Agent, or Firm*—Workman Nydegger

(57) ABSTRACT

The present invention provides for validating that one or more modules reside on the same machine. When a second module wishes to establish communication with a first module, a shared memory that is accessible by the modules—but inaccessible by modules outside the machine—is used to store random data. The first module listens on a transport address corresponding to the random data for communication activity. The second module retrieves the random data from the shared memory, and then uses this data for determining the appropriate transport address to send information to when establishing the communication with the first module.

11 Claims, 6 Drawing Sheets

ON-MACHINE COMMUNICATION VERIFICATION

CROSS-REFERENCE TO RELATED APPLICATIONS

N/A

BACKGROUND OF THE INVENTION

1. The Field of the Invention

The present invention generally relates to securing communication between modules. More particularly, the present invention provides for efficiently establishing a secure communication between modules by utilizing a secured shared memory to ensure that the modules reside on the same computing device.

2. Background and Related Art

Computer networks have enhanced our ability to communicate and access information by allowing one computer or device to communicate over a network with another computing device using electronic messages. When transferring an electronic message between computing systems, the electronic message will often pass through a protocol stack that performs operations on the data within the electronic message (e.g., packeting, routing, flow control, etc.). The Open System Interconnect (OSI) model is an example of a networking framework for implementing such protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed to intermediate lower layers and then onto a network. When data is received from a network it enters the physical layer and is passed up to the higher intermediate layers and then eventually received at the application layer. The application layer (the upper most layer) is responsible for supporting applications and end-user processes, such as, electronic conferencing software.

Often, when computing modules or processes are to communicate with each other, the computing systems will first establish a communication session. For example, in a network environment or on a single machine, a client application will request access to a resource of a server application. If an appropriate request is received by the server application, the server application can then respond by sending the requested resource to the client application.

In order to increase the likelihood of a secure communication between the client and a server, there are many typical security mechanisms that can be used depending upon the OSI layer and the protocol. For example, a layer incorporated by most protocol stacks is the transport layer, which can provide the features of end-to-end error recovery, re-sequencing, and flow control to the application layer. An example of a transport layer protocol that implements these features is the Transmission Control Protocol/Internet Protocol (TCP/IP).

At this layer, and at higher layers, in a protocol stack (e.g., an application layer) a handshake sequence (e.g., Secure Socket Layers (SSL) handshake) is frequently used to establish a secure communication between a client module and a server module, either on different systems or within the same device. During such handshake sequence, a client and a server can exchange version number, ciphering settings, and other communication information necessary to communicate using SSL. Once established, an SSL secure communication allows the client and the server to cooperate in the creation of session keys for encryption, decryption and tamper protection (e.g., digital signing) of electronic messages transferred between the client and the server.

Of course there are many other ways of establishing a secure communication and authenticating the client and/or server. For example, a public key, private key pair can be used to authenticate and validate electronic data. In a public key/private key scheme, the author encrypts the data using a private key. The encrypted data can only be decrypted using the author's public key. Accordingly, the recipient of data can access the public key and upon properly decrypting the data, the recipient can be certain that the data originated with the author. For extra security, the data can be encrypted several times, using several layers of public and private keys of both the author and the recipient.

As mentioned above, the upper most layer in the OSI model is the application layer. The functionality of lower layers of a protocol stack is typically abstracted from the application layer. That is, application data is transferred to and from an application layer through the lower layers, without exposing the functionality of the lower layers to the application layer. Abstraction can make it appear to a number of application layer processes at different computing systems that the application layer processes are directly connected to one another (when in fact lower layers in the corresponding protocol stacks process data as data transfer between the application layer processes). Accordingly, communication between two application layer processes can be viewed as a logical connection on a single machine regardless of the underline physical network that facilitates the communication.

There are many instances, however, when processes should be validated as being on a single machine, e.g., for configuration purposes or as an added security layer. Although the above identified techniques for ensuring a secure communication work well for communications between multiple machines, none of these techniques can be used to efficiently ensure that two modules within a communication (e.g., client/server) reside on a single machine.

For example, the handshake sequence previously described only ensures that one module has authenticated another module for establishing a communication. This security measure, however, does not ensure that the two modules reside on the same machine. Further, even though the above described session keys and public/private key pairs for encryption and decryption (as well as digital signing) might be used for ensuring that the processes reside on the same machine, such use would be a heavy burden on the limited recourses of a single computing system. This is especially true for such protocols that act as first-in-first-out folders, e.g., Named Pipes. Accordingly, there exists a need for efficiently establishing a secure communication by establishing that two modules reside on the same computing device.

BRIEF SUMMARY OF THE INVENTION

The above-identified deficiencies and drawbacks of current systems for establishing secure communications are overcome by the present invention. For example, the present invention provides for efficiently establishing a secure communication between modules by utilizing a shared memory to verify that the modules reside on a computing device.

For example, exemplary embodiments provide for generating random data used to identify a transport address of a listener. The transport address is used to verify that a connector resides on a computing device. The random data is then stored in a secured shared memory accessible by the listener and the connector, but inaccessible to modules outside the computing device to maintain the security thereof. The listener then listens for communication activity at the transport address identified by the random data. Information is then received at the transport address for establishing communication with the connector.

Other example embodiments provide for accessing a secured shared memory accessible by a listener and connector of a computing device. As before, the secured shared memory is inaccessible to modules outside the computing device to maintain the security thereof. Random data is then retrieved from the shared memory and used to identify a transport address of the listener, which is used to verify that the connector resides on the computing device. Information for establishing communication with the listener is then sent to the transport address.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
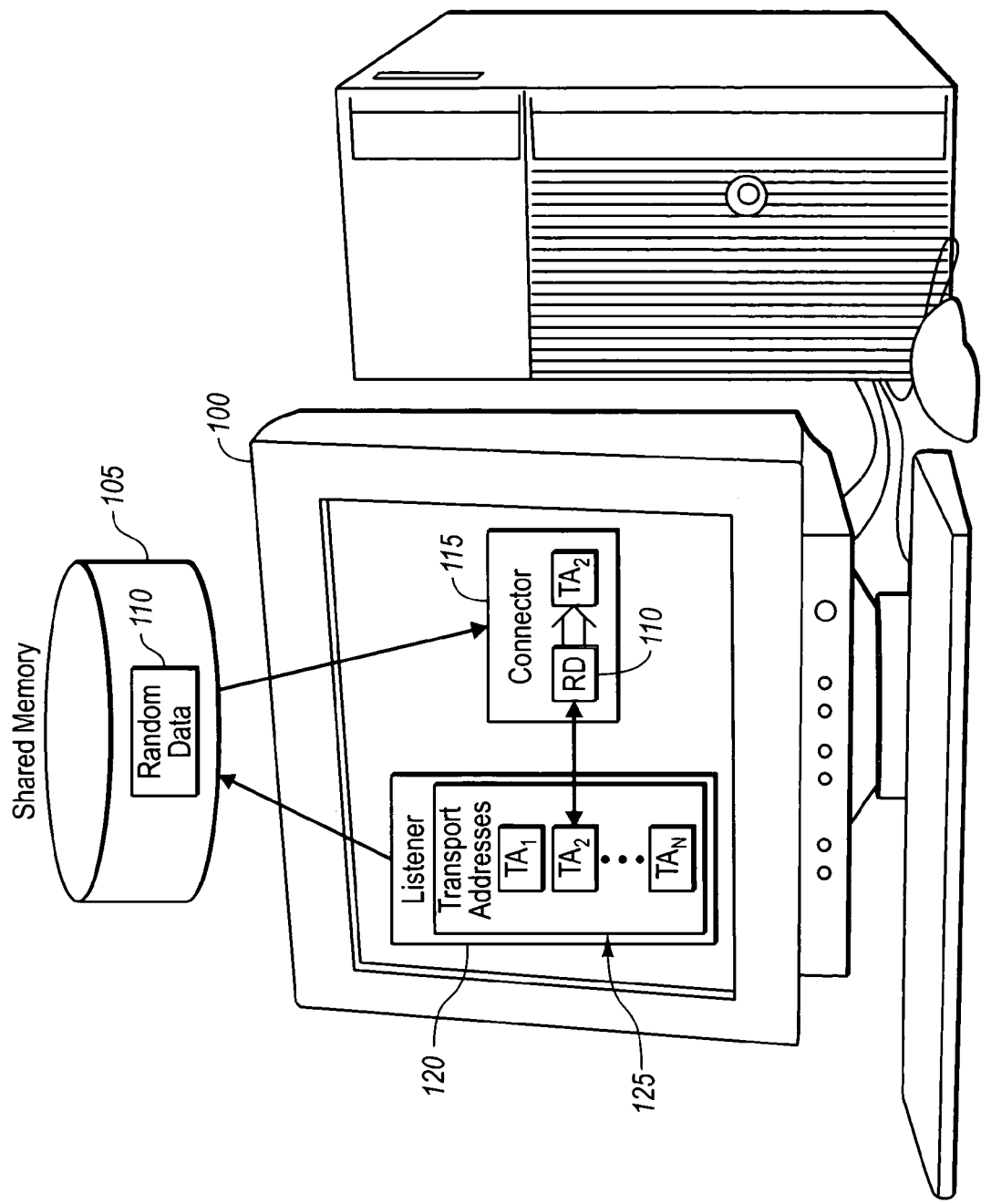
FIG. 1A illustrates utilizing a shared memory for ensuring that the connector resides on a computing device in accordance with example embodiments of the present invention.

The present invention extends to methods, systems and computer program products for ensuring that two modules reside on a single computing device. The embodiments of the present invention may comprise a special purpose or general-purpose computer including various computer hardware, as discussed in greater detail below.

Processes or modules frequently use shared memory, which typically means memory available on one CPU and memory shared between several CPUs on a machine, but unavailable outside it. For example, a spreadsheet program may need to pass spreadsheet data to a word processing program so that the word processing program can incorporate the spreadsheet data into a document. The spreadsheet program can pass the data to the word process program using shared memory. To pass the data, the spreadsheet program requests the kernel to allocate a block of memory for use as shared memory. In response, the kernel allocates the memory, maps the block of memory to the address space of the spreadsheet program, and returns to the spreadsheet program a resource identifier that identifies the block of memory. This spreadsheet program then writes the spreadsheet data to the block of memory and requests the kernel to allow the word processing program to share the block of memory. The kernel generates another resource identifier that the word processing program can use to access the block memory. Once the block of memory is mapped into its address space, the word processing program can access the spreadsheet data.

The present invention takes advantage of these and other types of shared memory for establishing a communication between two modules and increasing the likelihood that the two modules reside on the same machine. Note that there are many well known ways of establishing and identifying shared memory between modules on a computing device. Accordingly, the above example for creating, allocating and identifying shared memory is used for illustrative purposes only and is not meant to limit or otherwise narrow the scope of the present invention.

Regardless of how the shared memory is established and identified, exemplary embodiments of the present invention provide for efficiently establishing a secure communication between modules on a computing device by utilizing such shared memory in determining a transport address used to secure the communication. The secured shared memory should be accessible by modules on a computing device, but inaccessible to modules outside the computing device to maintain the security thereof. Random data, e.g., a string, number, Uniform Resource Identifier (URI), or other unique identifier, is generated and stored in the secured shared memory. One module can then access the random data for determining the transport address for connecting with the other module. This ensures, or at least gives some security, that the module connecting to the transport address resides on the same computing device.

Note the computing device may be expanded to a closely coupled network of computers that have a shared memory inaccessible to modules outside the networking devices. Accordingly, computing device as referenced herein, should be broadly construed to encompass a tightly grouped network that has shared memory accessible by at least two modules within the system, but inaccessible to modules outside the computing network.

FIG. 1A illustrates the features of the above-identified exemplary embodiments. As shown, a listener 120 and a connector 115 reside on a computing device 100. The connector 115 wishing to access services offered by listener 120 needs to determine which transport address 125 to send requests to.

Listener 120 will typically have a multitude of transport addresses 125 (e.g., $TA_1$-$TA_N$) that can be uniquely identified through any well known means. For example, as mentioned above, the transport addresses 125 may be uniquely identified by a string, number, URL, name or any other character or string of characters that can be used to uniquely identify the transport address 125. Further, any well known or shared function, e.g., a hash function, can be used to further uniquely identify the transport addresses 125. In addition, in the case wherein the transport address is identified by a unique URL, e.g., http://www.example.com/blah/1234/aaa-club=something?, the transport addresses can be uniquely identified in a hierarchical fashion. That is, the transport addresses 125 can be represented by any set of characters or strings within each section of the URL (e.g., blah or 1234). In such instance, as described in greater detail below, each section may be tried in successive order to determine which transport address 125 connector 115 should send data across.

Regardless of how each of the transport addresses 125 are uniquely identified, in order to efficiently establish a secure communication, random data 110 is generated, e.g., by listener 120, and stored in shared memory 105. This random data 110 corresponds to one of the uniquely identifiable transport addresses 125 as described above. Accordingly, listener 120 monitors or listens for data activity on the transport address 125 corresponding to the random data 110. The random data 110 can be retrieved by connector 115 from the shared memory 105. Once connector 115 retrieves the random data 110, it may use this data in order to identify the transport address 125 that the listener 120 is monitoring for establishing a communication therewith. In this example, as shown in FIG. 1A, random data 110 points to transport address $TA_2$, wherein information can be sent to this transport address for verifying that the connector 115 resides on computing device 100.

Note that although in the example of FIG. 1A, listener 120 generates and stores random data 110 in shared memory 105 and connector 115 retrieves the random data for determining the appropriate transport address, other modules are also capable of generating, storing and retrieving the random data 110. For example, a separate module (e.g., the kernel) may generate random data 110 and store it in shared memory 105 and give notice of the random data 110 to the listener 120. Further, as described below, other mechanisms can be used for retrieval and determine the appropriate transport address 125, which can give this information to the connector. Accordingly, any reference to a particular model for generating, storing and retrieving random data 110 or for determining transport addresses 125, as well as other actions preformed herein, are used for illustrative purposes only and are Not meant to limit or otherwise narrow the scope of the present invention unless explicitly claimed.

Note also that shared memory 105 is shown outside of computing device 100; however, other topologies are also available to the present invention. For example, shared memory 105 may reside within computing device 100. Nevertheless, the shared memory needs to be secure in that modules outside computing device 100 cannot access the shared memory. Accordingly, the location of the shared memory is not meant to limit or otherwise narrow the scope of the present invention; however, the secure shared memory should not be accessible to modules outside the computing device 100.

Further note that the random data 110 itself, without any manipulation, may uniquely identify the transport address 125 to use for establishing a communication with the listener 120. Alternatively, a function, e.g., a hash function, may be used to transform or convert random data 110 into the appropriate unique identifier for the transport address 125 used in the communication. Regardless, however, of whether the random data 110 itself or a function thereof is used to identify the appropriate transport address 125, the transport address 125 identified should be a unique transport address 125 (e.g., a local unique identifier, a Global Unique IDentifier or GUID, etc.) in order to ensure that overlapping communications between other connectors 115 (and/or other devices) do not interfere with the communication. Moreover, the larger the number of uniquely identifiable transport addresses 125 available, the greater the difficulty in attacking or hacking the current system.

In addition, as noted above, the random data 110 may correspond to a URL. In such instance, the various sections of the URL may each represent a unique transport address 125. For example, taking the URL given above of http://www.example.com/blah/1234/aaa-club=something?, the transport addresses can be uniquely identified in a hierarchical fashion. That is, connector 115 would first try to communicate with listener 120 over the transport address 125 corresponding to http://www.example.com/blah/1234/aaa-club=something?. If unsuccessful, the connector 115 would then try the transport address http://www.example.com/blah/1234/, and so on until arriving at the appropriate transport address 125.

Of course, other processes are available for appropriately determining the transport address 125, e.g., by randomly trying the various sections of the URL. Accordingly, the above described embodiment for determining the transport address 125 to use based on a URL, as well as other ways of determining the transport address 125 as described herein, are used for illustrative purposes only and are not meant to limit or otherwise narrow the scope of the present invention unless explicitly claimed.

Figure 1B:
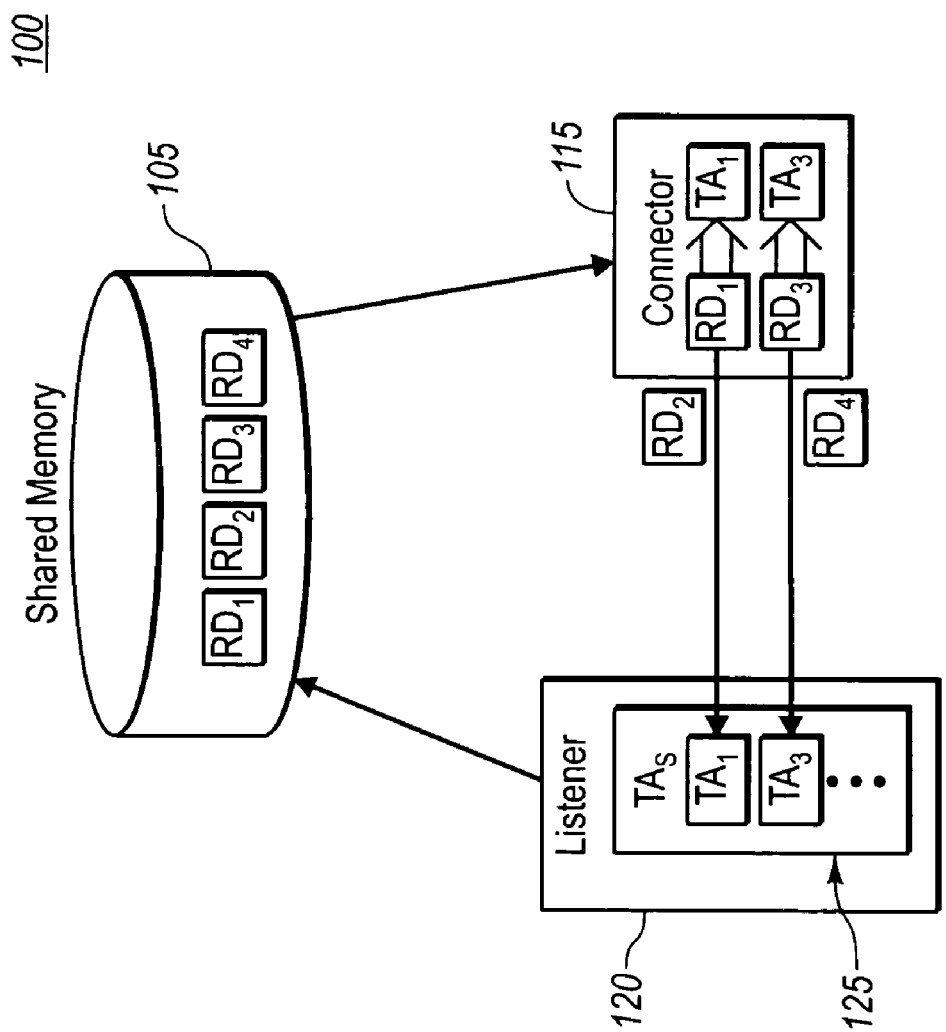
FIG. 1B illustrates utilizing the shared memory for further ensuring that the connector resides on a computing device in accordance with example embodiments of the present invention.

Although the above described embodiment with reference to FIG. 1A gives some level of security in establishing a communication, the system is still prone to attack. For example, a hacker may be able to guess the transport address 125 open for communication. Accordingly, other exemplary embodiments provide for further insurance or measures for establishing a secure communication between a listener 120 and connector 115. For example, as shown in FIG. 1B, multiple random data, e.g., $RD_1$-$RD_4$, may be generated and stored in shared memory 105 for verifying that connector 115 resides on computing device 100.

In one example embodiment, $RD_1$ is utilized similar to the above-identified process in establishing or identifying a transport address 125 for establishing communication between the connector 115 and the listener 120. That is, listener 120, e.g., can generate and store in the shared memory $RD_1$. Connector 115 accesses the shared memory 105 and uses $RD_1$ for determining or identifying transport address $TA_1$ for sending information for establishing a communication with listener 120.

$RD_2$ can also be generated by listener 120 and stored in shared memory 105. In this embodiment, rather than using $RD_2$ for identifying a transport address 125, information associated with $RD_2$ can be sent to the already identified transport address $TA_1$ in order to prove that connector 115 has knowledge of $RD_2$. For example, connector 115 can send the actual value of $RD_2$ to $TA_1$, whereupon receiving $RD_2$ listener 120 can be further assured or confident that connector 115 resides on computing device 100.

Of course, the larger possible values of random data, the less susceptible the system is to attack. Further, the more random data or values used in this process, the greater the probability that the connector 115 resides on the computing device 100. Note also that this technique also works for subsequent example embodiments as described below, e.g., when verifying that the listener 120 resides on the computing device 100. In addition, note that the actual value of $RD_2$ does not need to be used to verify that the connector 115 has knowledge thereof. For example, a hash function or any other well known way of cryptographically securing information may be used to verify to the listener 120 that the connector 115 has knowledge of $RD_2$.

Other exemplary embodiments provide for an added security feature that swaps random data used in determining the appropriate transport address 125 for the communication between listener 120 and connector 115. For example, as shown in FIG. 1B, listener 120 and connector 115 have already established communication at transport address $TA_1$ in accordance with the above exemplary embodiments. Listener 120 can further generate random numbers $RD_3$ and $RD_4$ and store them in shared memory 105. Listener 120 will then listen on transport address $TA_3$ for communication activity. After some preset determined time, listener 120 will then disconnect communications with $TA_1$. Accordingly, if connector 115 wishes to continue communications, connector 115 will need to retrieve $RD_3$ from shared memory 105 in order to determine the new transport address $TA_3$ for connecting to listener 120. Remote data $RD_4$ may also be used or retrieved from shared memory 105 for further verifying the connector 115 resides on computing device 100, as previously described above.

Figure 1D:
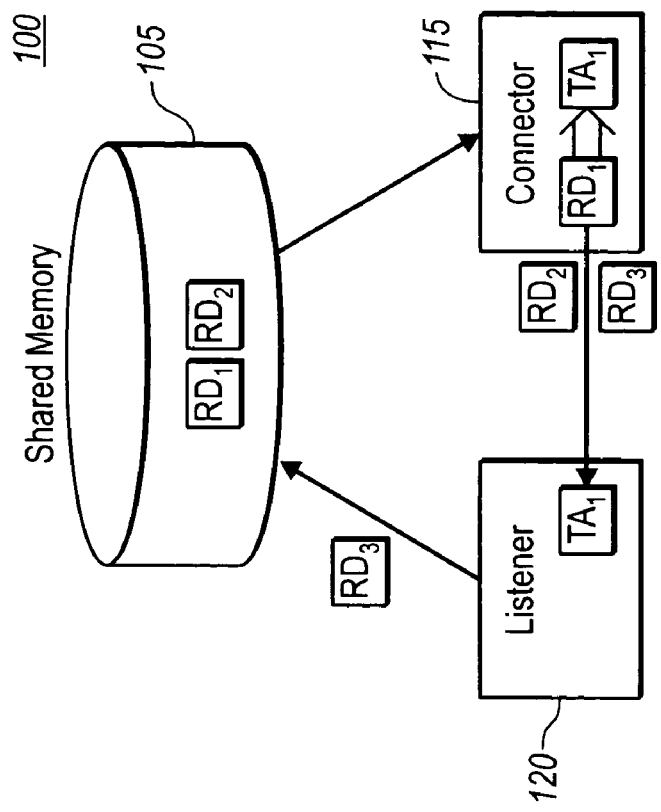
FIGS. 1C and 1D illustrate two approaches for ensuring that a listen resides on a computing device by utilizing the shared memory in accordance with example embodiments.
Figure 1C:
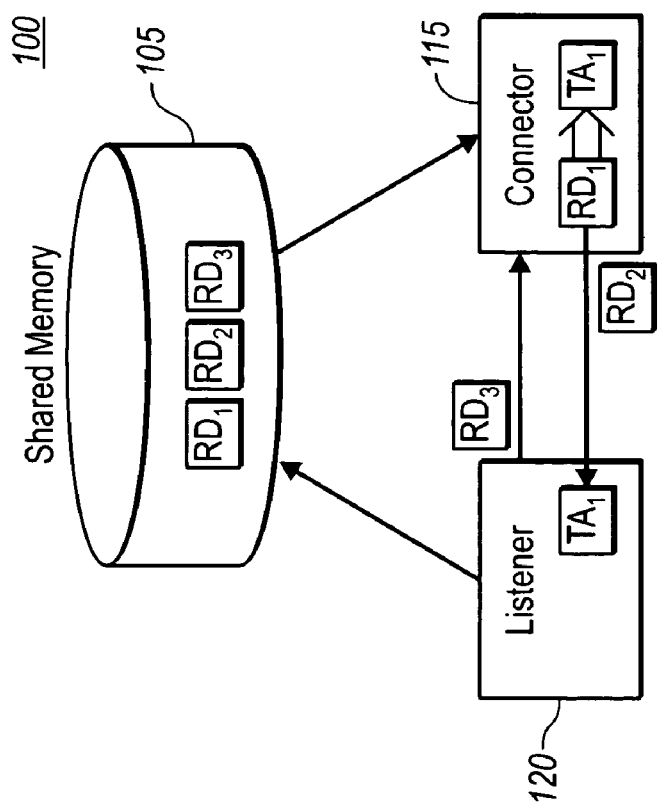

The above examples have been used to illustrate how listener 120 can use secured shared memory 105 for verifying that connector 115 resides on computing device 100. Other exemplary embodiments, however, also provide for verifying that listener 120 resides on computing device 100. For instance, as shown in FIG. 1C, listener 120 can generate three pieces of random data $RD_1$, $RD_2$ and $RD_3$. Random data $RD_1$ and $RD_2$ can be used in a similar manner as that described above for establishing a communication between listener 120 and connector 115 at transport address $TA_1$. In this embodiment, rather than connector 115 accessing the shared memory for sending $RD_3$ to listener 120, the listener 120 sends $RD_3$, or some representation thereof, across the established communication to connector 115. Connector 115 may then access shared memory 105 to retrieve $RD_3$ and compare with it the information sent by listener 120. If the data matches, connector 115 can thereby be reasonably assured that listener 120 resides on computing device 100.

The above embodiment allowed the listener 120 to generate the random data used in determining that listener 120 resides on computing device 100. In another example embodiment, connector 115 may generate the random data used to verify that listener 120 resides on computing device 100. For example, as shown in FIG. 1D, remote data $RD_1$ and $RD_2$ are used in establishing a communication between connector 115 and listener 120, similar to those embodiments described above. In this embodiment connector 115 generates random data $RD_3$ and sends $RD_3$, or at least information corresponding $RD_3$, to the transport address $TA_1$ used in the communication. Upon receiving the random data $RD_3$ (or some representation thereof) listener 120 stores it in shared memory 105. Connector 115 may then access shared memory 105 and validate that $RD_3$ has been stored there. Thus, listener 120 has shown that it has knowledge of $RD_3$ and access to shared memory 105; and therefore, connector 115 can be reasonably assured that listener 120 resides on computing device 100.

As previously discussed with regards to other random data used, note that although the exact value for $RD_3$ was used to verify listener 120 has knowledge of $RD_3$ other ways of verifying $RD_3$ are available to the present invention. For example, a hash of $RD_3$, or any other cryptographically well know way of securing information is also available to the present invention, as previously described. Accordingly, the usage of the exact value of $RD_3$ in validating that listener 120 resides on computing device 100 is used for illustrative purposes only and is not meant to limit or otherwise narrow the scope of the present invention unless otherwise explicitly claimed.

Figure 1E:
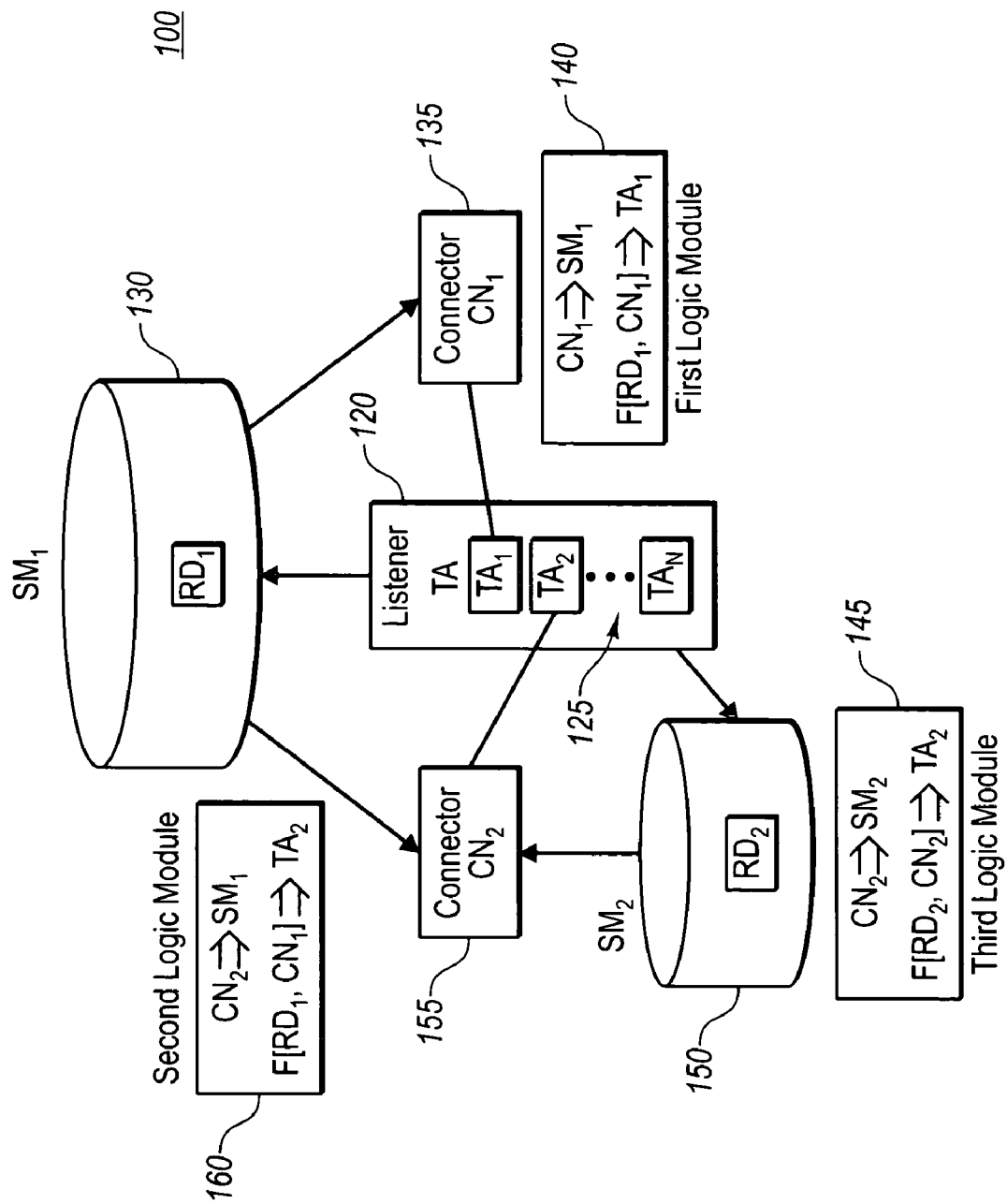
FIG. 1E illustrates how several connectors attempting to connect with the listener can utilize shared memory for ensuring that the connectors reside on the same computing device in accordance with example embodiments of the present invention.

Although the above embodiments have been described in the context of a single connector 115, each embodiment as previously described can also include multiple connectors. For example, as shown in FIG. 1E, computing device 100 includes a listener 120 with numerous transport addresses 125 ($TA_1$-$TA_N$) and two connectors 135, 155 with connector names $CN_1$ and $CN_2$, respectively. Also included in computing device 100 are shared memories $SM_1$ and $SM_2$. In this embodiment, either the same shared memory can be used to retrieve random data, or typically each connector 135, 150 will have its own shared memory or memory segment with listener 120. For example, connector 135 wishing to establish communication with listener 120 identifies the appropriate shared memory 130 $SM_1$ to access.

In one embodiment, as shown in first logic module 140, the connector name $CN_1$ can be used to point to shared memory $SM_1$. Note that $SM_1$ may be directly identified by $CN_1$ or a function, e.g., hash function, of $CN_1$ may also appropriately point to $SM_1$. In any event, once the appropriate shared memory is identified, listener 120 can generate a random data $RD_1$ and store it in shared memory 130 $SM_1$. Connector 135 may then retrieve $RD_1$ from the shared memory 130 $SM_1$ for use in determining the appropriate transport address for sending information to the listener 120. Using at least the random data $RD_1$—and possibly the connector name $CN_1$—first logic module 140 can use a function in order to determine the appropriate transport address, e.g., $TA_1$. As previously noted, depending upon whether or not $RD_1$ by itself can uniquely identify and point to transport address $TA_1$, connector name $CN_1$ may or may not be used within the function for identifying address $RD_1$.

Note that this use of the connector name for pointing to the appropriate shared memory and/or in uniquely identifying the appropriate transport address can be utilized throughout the following discussion regarding multiple connections. Accordingly, only brief mention of this function will be described in the follow description of FIG. 1E. Nevertheless, the absence of such description is not meant to limit or otherwise narrow the scope of the present invention. Note also, as described below, that the other ways of identifying shared memory are also available to the present invention.

Connector 155, as well as connector 135, have various ways for identifying the appropriate transport address to use for listener 120. For example, if the connector 155 with connector name $CN_2$ is directed to the same shared memory of connector 135 then second logic module 160 can be used for identifying the appropriate transport address. In this exemplary embodiment because the random data $RD_1$ is used for both connector 135 and 155, the determination of the transport address should also be a function of $CN_2$. That is, $CN_2$ needs to be unique to connector 155 such that second logic module 160 can take remote data $RD_1$ and connector name $CN_2$ to uniquely identify a transport address $TA_2$ for connector 155 to use in establishing a communication with listener 120.

Alternatively, connector 155 can have its own shared memory 150 or memory segment with listener 120. For example, connector name $CN_2$ may point to the shared memory 150 $SM_2$, whereupon connector 155 can retrieve remote data $RD_2$ generated by, e.g., listener 120. Note in this embodiment, $RD_1$ may be different from $RD_2$ in order to ensure uniqueness in the transport addresses 125 used in each communication. Alternatively, the connector names $CN_1$ and $CN_2$ would need to be unique and included in the determining of the transport address 125. Connector 155 can use $RD_2$, along with possibly connector name $CN_2$, as shown in third logic module 145 for uniquely identifying transport address $TA_2$.

Note that in the instance that each connector is assigned its own shared memory that the shared memory segments do not necessarily have to be physically different. For example, the connectors may share different offsets in the same shared memory block supplied, e.g., by the kernel. Accordingly, "own shared memory" as used herein should be broadly construed to include not only different memory sections, but also to include offsets of the same memory segment.

The present invention may also be described in terms of methods comprising functional steps and/or non-functional acts. The following is a description of steps and acts that may be preformed in practicing the present invention. Usually, functional steps describe the invention in terms of results that are accomplished were as non-functional acts describe more specific actions for achieving a particular result. Although the functional steps and non-functional acts may be described or claimed in a particular order, the present invention is not necessarily limited to any particular ordering or combination of steps and/or acts. Further, the use of steps and/or acts in the recitation of the claims and the follow description of the flow charts for FIG. 2 are used to indicate the desired specific use of such terms.

Figure 2:
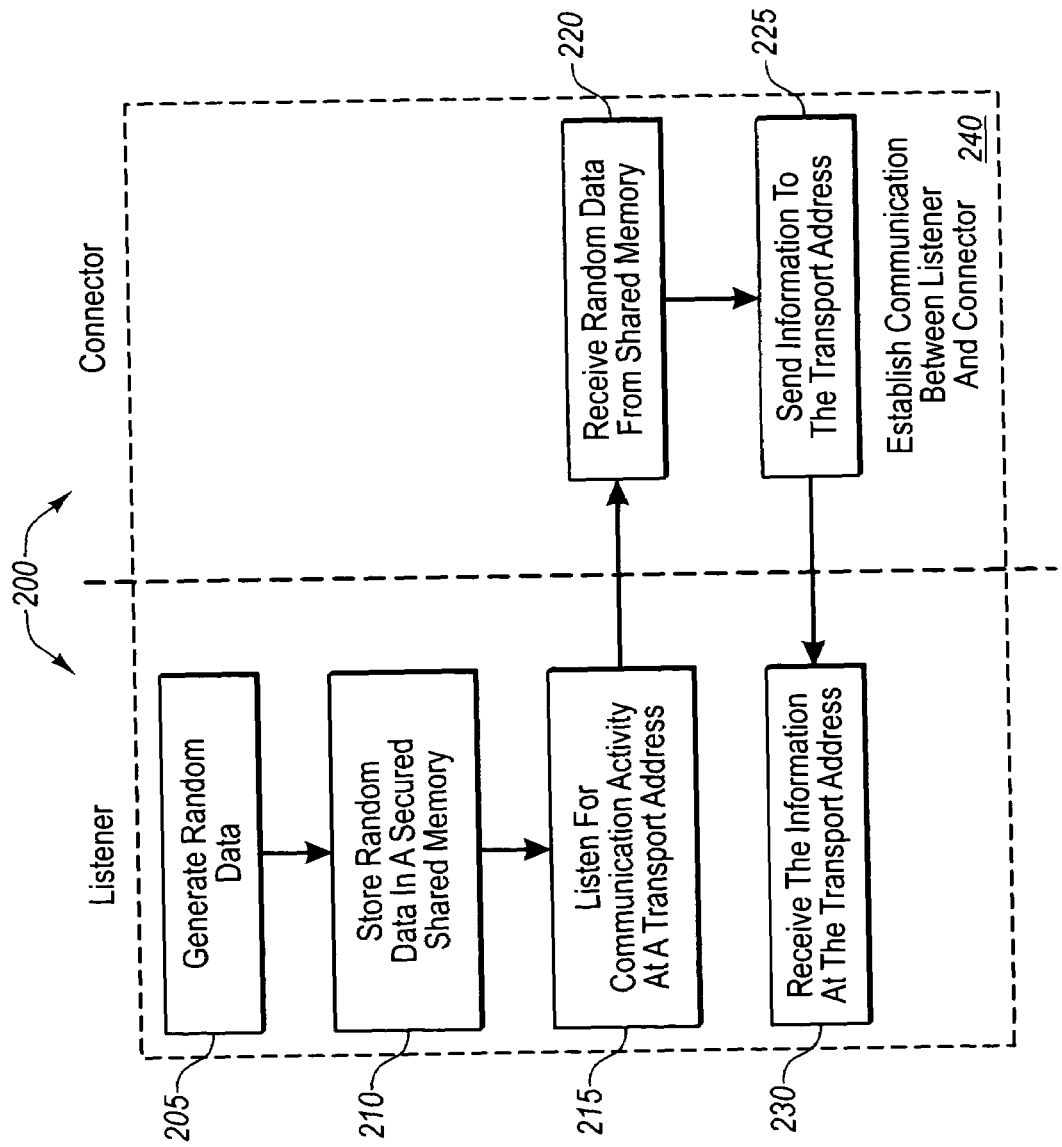
FIG. 2 illustrates a flow chart of a method of efficiently establishing a secure communication between two modules in accordance with exemplary embodiments.

FIG. 2 illustrates an example flow chart for various exemplary embodiments of the present invention. The following description of FIG. 2 will occasionally refer to corresponding elements from FIGS. 1A-1D. Although reference may be made to a specific element from these Figures, such elements are used for illustrative purposes only and are not meant to limit or otherwise narrow the scope of the present invention unless explicitly claimed.

FIG. 2 illustrates an example flow chart of a method 200 of efficiently establishing a secured communication between modules by utilizing a shared memory to verify that at least one of the modules resides on a computing device. Method 200 includes a step for establishing 240 a communication between a listener and a connector. For example, on the listener side of method 200, step 240 includes an act of generating 205 random data. For instance, listener 120 may generate random data 110; used to identify a transport address 125 of listener 120. The transport address is further used to verify that a connector 115 resides on computing device 100. Random data 110 may be one or more of a string, number, uniform resource identifier, name, character; or string of characters used in uniquely identifying the transport address 125. Further, the random data may be hashed using a hash function, e.g., SHA1, which transforms the random data for appropriately identifying the transport address 125. In one embodiment, random data 110 is a number, wherein the number needs to be converted to one or more of a string, uniform resource identifier, name, or other way for uniquely identifying the transport address.

Still on the listener side of method 200, step 240 includes an act of storing 210 random data in a secured shared memory. For example, listener 120 may store random data 110 in shared memory 105 accessible by the listener 120 and connector 115, but inaccessible to modules outside the computing device 100 to maintain the security thereof. The shared memory 105 may be external to or internal to computing device 100. Also on the listener of method 200, step 240 further includes an act of listening 215 for communication activity at a transport address. That is the transport address 125 identified by the random data 110 is monitored by listener 120 for communication activity.

On the connector side of method 200, step 240 includes an act of receiving 220 the random data. For example, connector 115 can access random data 110 from shared memory 105 to identify the transport address 125 for sending information to the listener. Still on the connector side of method 200 step 240 includes an act of sending 225 information to the transport address. For example, connector 115 can use random data 110 to determine that transport address $TA_2$ from the list of transport addresses 125 should be used for communicating or establishing a communication with listener 120.

Back on the listener side of method 200, step 240 includes an act of receiving 230 the information at the transport address. For example, listener 120 may receive information from connector 115 at the transport address $TA_2$ via a transport protocol for establishing communication with the connector 115. The transport protocol may be one of a Named Pipe, TCP/IP, HTTP, UDP, etc.

Not shown in flow diagram for method 200, other exemplary embodiments provide for generating second random data used to further verify that the connector 115 resides on computing device 100. For example, as shown in FIG. 1B, listener 120 can generate random data $RD_2$ and store random data $RD_2$ in the secured shared memory 105. Connector 115 may then retrieve from the secured shared memory 105 the second random data $RD_2$, wherein the information can be sent to and received at the transport address 125 for proving that the connector has knowledge of the second random data $RD_2$.

Also not shown in the flow chart of FIG. 2, listener 120 may further generate third and fourth random data, e.g., $RD_3$ and $RD_4$ in FIG. 1B. The third random data $RD_3$ is used to identify a second transport address $TA_3$ of listener 120. Listener 120 stores the third and fourth random data in the secured shared memory 105, and then listens for communication activity at the second transport address $TA_3$. Connector 115 may then retrieve from the shared memory 105 the third and fourth random data $RD_3$, $RD_4$, respectively. Connector 115 uses the third random data $RD_3$ to identify the second transport address $TA_3$ of the listener 120. Upon identifying the appropriate transport address $TA_3$, connector 115 may send to the second transport address second information for establishing a second communication with the listener 120. The second information may include data corresponding to the fourth random data $RD_4$ for proving the connector 115 has knowledge of the fourth random data $RD_4$. After a predetermined period of time, listener 120 may disconnect the communication with connector 115 over the transport address $TA_1$.

Further embodiments provide, as illustrated in FIG. 1D, generating third random data $RD_3$, which is used to verify that the listener 120 resides on the computing device 100. For example, listener 120 may generate remote data $RD_3$ and store such data in shared memory 105. Listener 120 may then transfer to connector 115 over the established communication information corresponding to the third random data $RD_3$ for proving that the listener 120 generated or has knowledge of the third random data $RD_3$. Upon receiving from the listener 120 the data corresponding to the third random data $RD_3$, connector 115 may retrieve from the secured shared memory 105 the data corresponding to the third random data $RD_3$ to verify that listener 120 has knowledge of the third random data $RD_3$.

In yet another example embodiment for verifying that listener 120 resides on computing device 100, as shown in FIG. 1D, connector 115 may generate third random data $RD_3$, wherein the information sent to the transport address $TA_1$ for establishing the communication with the listener 120 includes data corresponding to the third random data $RD_3$. Listener 120 then stores the third information in the shared memory 105 for proving that the listener 120 has knowledge of the third random data $RD_3$. Thereafter, connector 115 may retrieve from the secured memory 105 the data corresponding to the third random data $RD_3$ for verifying that the listener 120 resides on the computing device 100.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
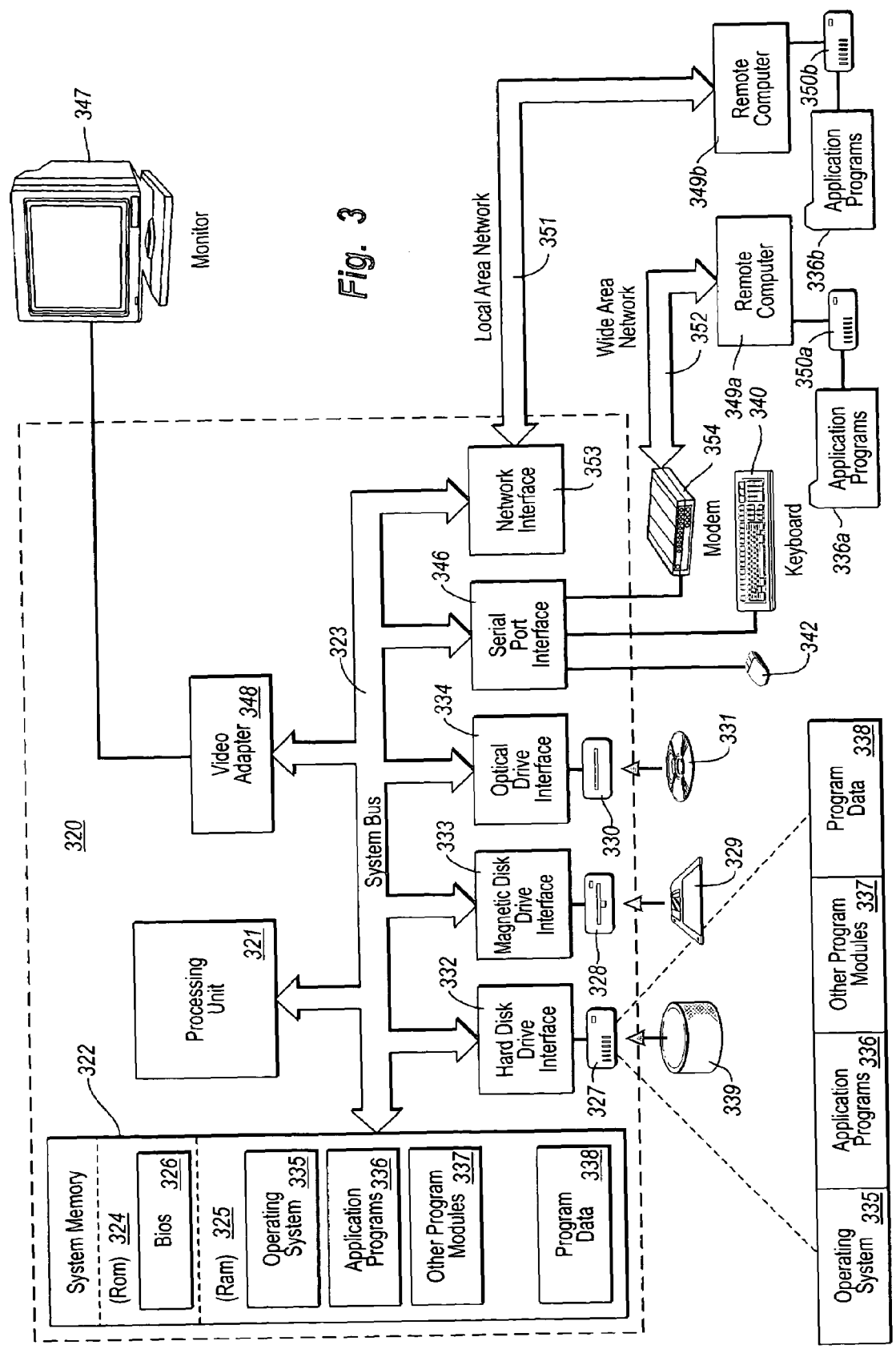
FIG. 3 illustrates an example system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 26, containing the basic routines that help transfer information between elements within the computer 320, such as during start-up, may be stored in ROM 24.

The computer 320 may also include a magnetic hard disk drive 27 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive, interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computing device, a method of efficiently establishing a secure communication used for receiving information from one or more modules on the computing device by utilizing a secure shared memory in determining a transport address to be used for the secure communication, the method comprising:
    generating first random data by a listener module, wherein the first random data is used to identify a first transport address of the listener module, and the first transport address is used to verify that a connector module resides on the computing device and to establish communicate between the listener module and the connector module;
    storing the first random data by the listener module in the secured shared memory, the first random data identifying the first transport address, the secured shared memory being accessible by the listener and the connector modules, but inaccessible to modules outside the computing device;
    the listener module listening for communication activity at the transport address identified by the random data;
    the listener module receiving at the first transport address the information from the connector module to establish that the connector module resides on the computing device;
    generating second random data, by the listen module, the second random data used to further verify that the connector module resides on the computing device;
    generating third random data by the connector module, the third random data used to verify that the listener module resides on the computing device;
    sending the third random data to the first transport address by the connector module;
    storing the third random data in the secure shared memory by the listen module upon receiving the third random data from the connector module; and
    retrieving information corresponding to the third random data from the shared memory by the connector module for proving that the listener module resides on the computing device.

2. The method of claim 1, wherein the first random data is one or more of a string, number, uniform resource identifier or name used to uniquely identify the first transport address.

3. The method of claim 1, wherein the first random data is a number, the method further including acts of: converting the number to one or more of a string, uniform resource identifier or name for uniquely identifying the first transport address.

4. The method of claim 1, wherein the information is received via a transport protocol chosen from the list of Named Pipe, TCP/IP, HTTP or UDP.

5. The method of claim 1, wherein the first random data is hashed using a hash function that transforms the random data for appropriately identifying the first transport address.

6. The method of claim 1, wherein after a predetermined period of time, listener module discontinues the communication with the connector module over the first transport address.

7. In a computing device, a computer program product comprising a computer readable storage medium having stored thereon computer executable instructions that, when executed by a processor, can cause the messaging system to perform the following:
    generating first random data by a listener module, wherein the first random data is used to identify a first transport address of the listener module, and the first transport address is used to verify that a connector module resides on the computing device and to establish communicate between the listener module and the connector module;
    storing the first random data by the listener module in the secured shared memory, the first random data identifying the first transport address, the secured shared memory being accessible by the listener and the connector modules, but inaccessible to modules outside the computing device;
    the listener module listening for communication activity at the transport address identified by the random data;
    the listener module receiving at the first transport address the information from the connector module to establish that the connector module resides on the computing device;
    generating second random data, by the listen module, the second random data used to further verify that the connector module resides on the computing device;
    generating third random data by the connector module, the third random data used to verify that the listener module resides on the computing device;
    sending the third random data to the first transport address by the connector module;
    storing the third random data in the secure shared memory by the listen module upon receiving the third random data from the connector module; and
    retrieving information corresponding to the third random data from the shared memory by the connector module for proving that the listener module resides on the computing device.

8. The computer program product of claim 7, wherein the first random data is one or more of a string, number, uniform resource identifier or name used to uniquely identify the first transport address.

9. The computer program product of claim 8, wherein the first random data is hashed using a hash function that transforms the random data for appropriately identifying the first transport address.

10. The computer program product of claim 7, wherein the first random data is a number, the computer program product further comprising computer executable instructions for converting the number to one or more of a string, a uniform resource identifier or a name for uniquely identifying the first transport address.

11. The computer program product of claim 7, wherein the information received is received via a transport protocol chosen from one of a Named Pipe, TCP/IP, HTTP or UDP.

* * * * *

UNITED STATES PATENT AND TRADEMARK OFFICE
CERTIFICATE OF CORRECTION

| | | |
|---|---|---|
| PATENT NO. | : 7,424,739 B2 | Page 1 of 1 |
| APPLICATION NO. | : 10/977400 | |
| DATED | : September 9, 2008 | |
| INVENTOR(S) | : Janiv Pessach | |

It is certified that error appears in the above-identified patent and that said Letters Patent is hereby corrected as shown below:

In column 5, line 49, delete "Not" and insert -- not --, therefor.

In column 9, line 46, delete "110; used" and insert -- 110 used --, therefor.

In column 9, line 50, delete "character;" and insert -- character --, therefor.

Signed and Sealed this
Third Day of May, 2011

David J. Kappos
*Director of the United States Patent and Trademark Office*